(12) United States Patent
Blank

(10) Patent No.: US 9,637,095 B2
(45) Date of Patent: May 2, 2017

(54) TEMPORARY PLATFORM BRAKE FOR A VEHICLE

(71) Applicant: INVENTIVE DRIVER EDUCATION ASSOCIATES, INC., Pikesville, MD (US)

(72) Inventor: Steven Jay Blank, Catonsville, MD (US)

(73) Assignee: Inventive Driver Education Associates, Inc., Pikesville, MD (US)

( * ) Notice: Subject to any disclaimer, the term of this patent is extended or adjusted under 35 U.S.C. 154(b) by 0 days.

(21) Appl. No.: 15/165,438

(22) Filed: May 26, 2016

(65) Prior Publication Data

US 2016/0355163 A1 Dec. 8, 2016

Related U.S. Application Data

(60) Provisional application No. 62/171,452, filed on Jun. 5, 2015.

(51) Int. Cl.
| | |
|---|---|
| *B60R 11/00* | (2006.01) |
| *G05G 1/34* | (2008.04) |
| *B60T 7/04* | (2006.01) |
| *B60T 7/06* | (2006.01) |
| *B60R 11/02* | (2006.01) |

(52) U.S. Cl.
CPC ............ *B60T 7/06* (2013.01); *B60R 11/0264* (2013.01); *G05G 1/34* (2013.01); *B60R 2011/0029* (2013.01); *B60T 7/04* (2013.01); *Y10T 74/20207* (2015.01); *Y10T 74/20528* (2015.01); *Y10T 74/20906* (2015.01)

(58) Field of Classification Search
CPC ............... G05G 1/34; Y10T 74/20207; Y10T 74/20528; Y10T 74/20906; B60R 2011/0029; B60T 7/04; B60T 7/06
See application file for complete search history.

(56) References Cited

U.S. PATENT DOCUMENTS

| | | | | | |
|---|---|---|---|---|---|
| 2,395,280 | A | * | 2/1946 | Law ......................... | G05G 1/34 |
| | | | | | 180/322 |
| 2,597,379 | A | * | 5/1952 | Romel ................... | B60K 23/00 |
| | | | | | 74/481 |
| 2,694,946 | A | * | 11/1954 | Vandal ................... | B60K 23/00 |
| | | | | | 248/200.1 |
| 2,799,181 | A | * | 7/1957 | Speckman ............. | B60K 23/00 |
| | | | | | 477/207 |

(Continued)

*Primary Examiner* — Laura Freedman
(74) *Attorney, Agent, or Firm* — McNees Wallace & Nurick LLC

(57) ABSTRACT

A platform for use with a temporary or auxiliary brake in a vehicle. An upper portion of the platform has a raised wall and stabilization flanges. The temporary or auxiliary brake is mounted on the raised wall. The raised wall is spaced from a floorboard of the vehicle. The stabilization flanges engage the floorboard to stabilize the upper portion. An extension plate, joined with a specialized and flexible weld, extends from the upper portion to provide increased stabilization of the platform and maintain the platform and the temporary or auxiliary brake in position on the floorboard of the vehicle, allowing the platform to fit virtually any year, make, or model of vehicle. The use of the platform and the temporary or auxiliary brake does not require drilling or deformation of the vehicle.

7 Claims, 2 Drawing Sheets

(56) References Cited

U.S. PATENT DOCUMENTS

| | | | | |
|---|---|---|---|---|
| 2,819,627 | A | * | 1/1958 | Larson .................. G05G 1/305 |
| | | | | 74/562.5 |
| 3,477,310 | A | | 11/1969 | Garcia |
| 3,943,795 | A | * | 3/1976 | Kenney .................... B60T 7/06 |
| | | | | 74/479.01 |
| 4,312,246 | A | | 1/1982 | Barresi |
| 6,435,055 | B1 | | 8/2002 | Sato |
| 6,494,115 | B1 | * | 12/2002 | Haugen .................... G05G 1/36 |
| | | | | 180/320 |
| 7,207,238 | B2 | * | 4/2007 | Feng ....................... G05G 1/34 |
| | | | | 188/2 D |
| 8,607,602 | B1 | | 12/2013 | Okoye et al. |

* cited by examiner

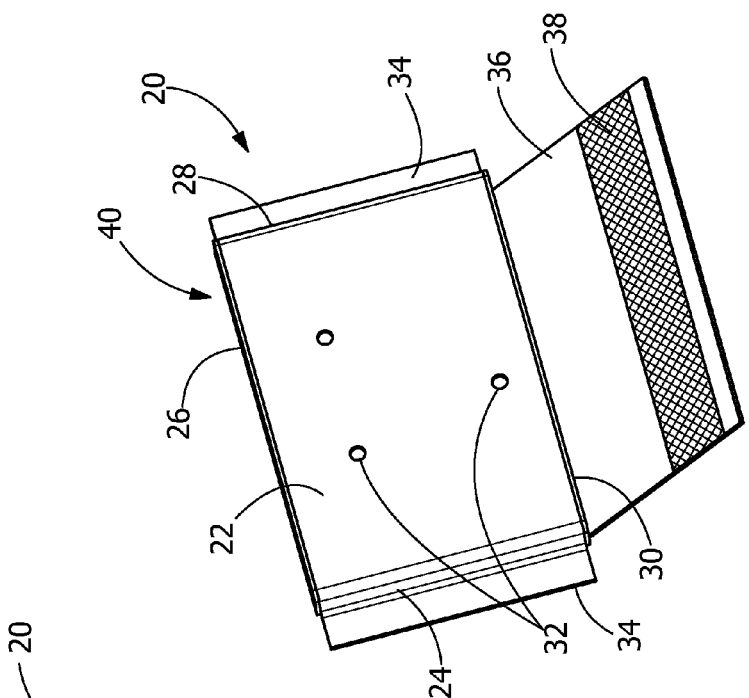
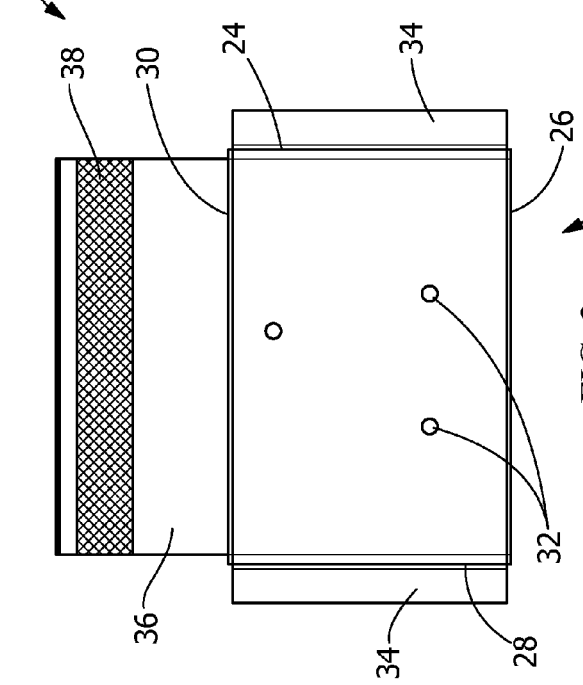
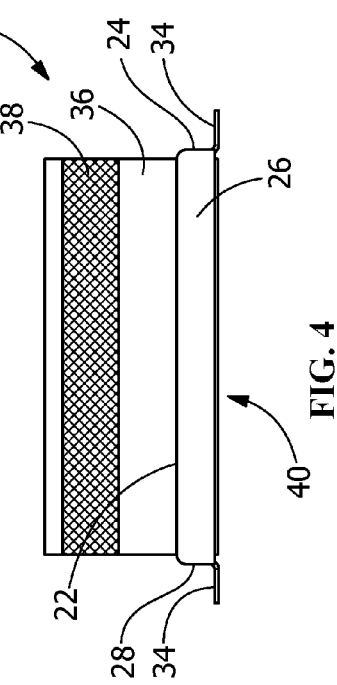

TEMPORARY PLATFORM BRAKE FOR A VEHICLE

FIELD OF THE INVENTION

This invention relates to dual operating system for controlling the braking system of a vehicle. More particularly, the invention is directed to a platform for use with a temporary or auxiliary brake and a temporary or auxiliary platform brake which does not require drilling for securing to a vehicle.

BACKGROUND OF THE INVENTION

Various systems are known for dual operation of functional systems such as braking systems, acceleration systems, clutching systems and so forth. One particular application of dual operator systems is for the control of braking systems in educational driving vehicles in which a passenger-teacher instructs a driver-student to drive, and in which, for safety's sake, provision is made for overriding the driver-student operation of the braking system in order to prevent accidents.

Sometimes students will panic and freeze on the brake, and the instructor may have a try to insert his foot on his auxiliary brake pedal to try to reverse the braking operation. This is awkward and time consuming and thus dangerous.

Dual braking mechanisms for motor vehicles are known in which a braking apparatus or braking pedal in a vehicle can be operated selectively by a student or instructor, or by a driver or his passenger. These systems can be operated by use of an intermediate rod, a hydraulic system, a flexible cable or other means.

However, when an auxiliary braking pedal is provided on the passenger side, the auxiliary braking pedal must be secured to vehicle by means of drilling the dashboard or floorboard, thereby damaging the vehicle. Consequently, the auxiliary braking pedal cannot be easily moved between vehicles. In addition, the mounting of the auxiliary braking pedal causes holes or the like remain after the auxiliary braking pedal has been removed. Further, economic loss occurs to the automobile owner (whether that entity be a dealer or private person) from directing labor and time to such effort and from the state and value of the vehicle, after such damage.

It would, therefore, be beneficial to provide an auxiliary braking pedal which does not need to be mounted to the vehicle, allowing for the previously nonexistent mobility of the auxiliary braking pedal between vehicles, as well. It would also be beneficial to provide an auxiliary braking pedal which does not cause economic loss occurs to the automobile owner from directing labor and time to mounting and unmounting the auxiliary brake and from the diminished state and value of the vehicle after the auxiliary braking pedal has been used.

SUMMARY OF THE INVENTION

An object is to provide an auxiliary or temporary braking pedal which is not mounted to the vehicle and which does not cause damage to the vehicle.

An object is to provide an auxiliary or temporary braking system that may be placed into a vehicle without drilling and bolting to the passenger-side floorboard.

An object is to provide an auxiliary or temporary braking pedal which is mobile and can be moved between vehicles.

An object to use the sloped and flat floorboard on the passenger-side of a vehicle to support an auxiliary or temporary braking pedal.

An embodiment is directed to a platform for use with a temporary or auxiliary brake in a vehicle. The platform includes a raised wall and stabilization flanges. The raised wall, on which the temporary or auxiliary brake is mounted, is spaced from a floorboard of the vehicle. The stabilization flanges extend essentially perpendicular to the raised wall. Wherein the use of the platform and the temporary or auxiliary brake does not require drilling or deformation of the vehicle.

An embodiment is directed to a platform for use with a temporary or auxiliary brake in a vehicle. An upper portion of the platform has a raised wall and stabilization flanges. The temporary or auxiliary brake is mounted on the raised wall. The raised wall is spaced from a floorboard of the vehicle. The stabilization flanges engage the floorboard to stabilize the upper portion. An extension plate extends from the upper portion to provide increased stabilization of the platform and maintain the platform and the temporary or auxiliary brake in position on the floorboard of the vehicle.

An embodiment is directed to a platform for use with a temporary or auxiliary brake in a vehicle which has an extension plate which extends from the upper portion to provide increased stabilization of the platform and maintain the platform and the temporary or auxiliary brake in position on the floorboard of the vehicle. The extension plate extends forward from the raised upper portion (to which the brake is bolted) is attached to the raised upper portion with a special weld or 'fillet weld' which may be adjusted, without breaking the weld, to fit virtually any year, make, or model of vehicle. The use of the platform and the temporary or auxiliary brake does not require drilling or deformation of the vehicle.

An embodiment is directed to a temporary or auxiliary platform brake which is connected to a brake pedal of a vehicle. The platform includes a temporary or auxiliary brake, an upper portion and an extension plate. The upper portion has a raised wall on which the temporary or auxiliary brake is mounted. The raised wall is spaced from a floorboard of the vehicle. The extension plate extends from the upper portion to provide increased stabilization of the platform and maintain the platform and the temporary or auxiliary brake in position on the floorboard of the vehicle. The use of the platform and the temporary or auxiliary brake does not require drilling or deformation of the vehicle.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

FIG. 2 is a perspective view of the platform of FIG. 1.

FIG. 3 is a plan view of the platform of FIG. 2.

FIG. 4 is a side view of the platform of FIG. 2.

DETAILED DESCRIPTION OF THE INVENTION

Figure 1:
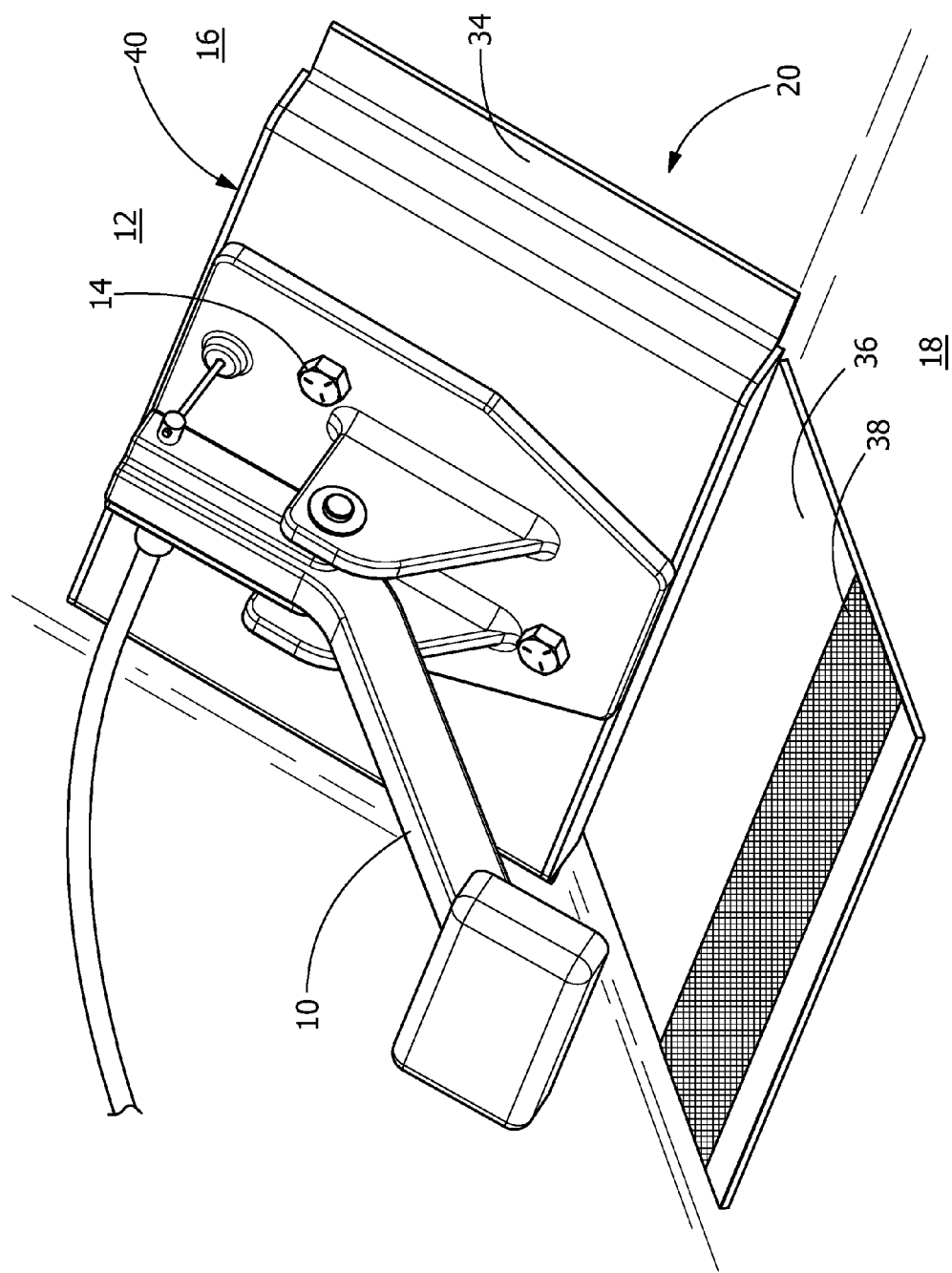
FIG. 1 is a perspective view of an exemplary temporary brake mounted on an illustrative platform according to the present invention.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the preferred embodiments. Accordingly, the invention expressly should not be limited to such preferred embodiments illustrating some possible non-limiting combination of features that may exist alone or in other combinations of features, the scope of the invention being defined by the claims appended hereto.

Referring to FIG. 1, a temporary or auxiliary brake 10 mounted on a platform 20 is shown. The temporary or auxiliary brake 10 allows for a dual operator system for the control of the braking of a vehicle. Such temporary or auxiliary brakes 10 are beneficial in various applications, including, but not limited to, educational driving vehicles in which a passenger-teacher instructs a driver-student to drive, and in which, for safety's sake, provision is made for overriding the driver-student operation of the braking system in order to prevent accidents.

In the illustrative embodiment shown in FIG. 1, the temporary or auxiliary brake 10 is connected to the brake pedal (not shown) of the vehicle by a flexible cable. The cable is actuated through pulleys that run through the temporary or auxiliary brake 10 on the passenger-side of the vehicle as the instructor "pushes" down, and towards a firewall or floorboard 12 of the vehicle. This action produces a simultaneous "pull" action as the same cable, run through pulleys on the driver-side, "pulls" the driver-side brake back, thereby slowing or stopping the vehicle as needed for safety. Although the temporary or auxiliary brake 10 is shown with a cable, other types of connections between the temporary or auxiliary brake 10 and the brake pedal of the vehicle are known in the industry and can be used with departing from the scope of the invention.

As best shown in FIGS. 2 through 4, platform 20 includes a raised or top wall 22 with sidewalls 24, 26, 28, 30 extending therefrom. The sidewalls 24, 26, 28, 30 extend perpendicular or approximately perpendicular to the raised or top wall 22. The raised or top wall 22 has one or more mounting openings 32 which extend therethrough. The mounting openings 32 are provided to accept mounting hardware 14, such as, but not limited to, bolts or screws. The mounting hardware 14 is used to securely mount the temporary or auxiliary brake 10 to the raised or top wall 22 of the platform 20.

Wings or stabilization flanges 34 extend from the sidewalls 24, 28. The stabilization flanges 34 extend from the ends of the sidewalls 24, 28 which are removed from the raised or top wall 22. The stabilization flanges 34 extend perpendicular or approximately perpendicular to the sidewalls 24, 28 and parallel or essentially parallel to the raised or top wall 22. The stabilization flanges 34 are configured to provide cooperate with the floorboard 12 of the vehicle, as will be more fully described.

In the illustrative embodiment shown, the raised or top wall 22, sidewalls 24, 26, 28, 30 and the stabilization flanges 34 are formed from one piece of material having the appropriate strength characteristics required. The raised or top wall 22, sidewalls 24, 26, 28, 30 and the stabilization flanges 34 form a brake mounting portion 40 of the platform 20. Such material may be, but is not limited to, A-32 gauge steel. However, other construction of the raised or top wall 22, sidewalls 24, 26, 28, 30 and the stabilization flanges 34 may be used. For example, separate pieces may be used for the raised or top wall 22, sidewalls 24, 26, 28, 30 and the stabilization flanges 34, with the separate pieces being welded together.

Also in the illustrative embodiment shown, the raised or top wall 22 is 10 inches long and 7.5 inches wide. The sidewalls are of equal height H of approximately two inches and the stabilization flanges 34 are approximately one inch in length L. However, other dimensions can be used without departing from the scope of the invention.

An extension plate 36 extends from the sidewall 30. In the embodiment shown, the extension plate 36 is attached to the sidewall 30 by fillet welding, which is known in the industry. Other methods of attaching the extension plate 36 may be used without departing from the scope of the invention.

In the embodiment shown, the extension plate 36 is made from material having the appropriate strength characteristics required. Such material may be, but is not limited to, A-32 gauge steel. The material of the extension plate 36 may be the same or may be different from the material used for the raised or top wall 22. In the illustrative embodiment shown, the extension plate 36 is ten inches long and six inches wide. However, other dimensions can be used without departing from the scope of the invention. A non-skid surface 38 may be applied to the extension plate 36 to prevent the user's foot from slipping during use. The non-skid surface 38 may be, but is not limited to, a non-skid tape. The non-skid surface 38 may also be placed on the bottom of the extension plate 36 to provide greater stability.

The extension plate 36 is attached to the sidewall 30 at an angle. The angle approximates the angle provided in the floorboard of the vehicle into which the platform 20 is to be used. While the particular angle of the floorboards may vary depending upon the model of vehicle, most vehicles have an angle of between 25 and 50 degrees between the portions of the floorboards. Therefore, an angle of 30-35% between the sidewall 30 and the extension plate 36 is sufficient to allow the platform 20 to be properly positioned in most vehicles. As the extension plate 36 is attached to the sidewall 30 by means of a fillet weld the angle of the extension plate 36 relative to the sidewall 30 may be adjusted, without breaking the weld, to fit virtually any year, make, or model of vehicle.

Referring again to FIG. 1, the platform 20 with the temporary or auxiliary brake 10 mounted thereon is positioned in the passenger compartment of the vehicle. The brake mounting portion 40 of the platform 20 is positioned on a sloped portion 16 of the floorboard 12. In this position, sidewalls 24, 26, 28, 30 and the stabilization flanges 34 engage the sloped portion 16 of the floorboards 12 to stabilize the platform 10 relative to the sloped portion 16. The raised or top wall 22 is elevated from the sloped portion 16, thereby allowing the mounting hardware 14 to extend through the raised or top wall 22 without engaging the sloped portion 16 of the floorboard 12.

The extension plate 36 is positioned on the flat portion 18 of the floorboard 12. The positioning of the extension plate 36 on the flat portion 18 provides increased stabilization of the platform 20. In addition, the frictional cooperation of the extension plate 36 with the flat portion 18 helps to ensure that the platform will be maintained in proper position relative to the floorboard 12 without the need to physically and permanently mount the platform 20 or the temporary or auxiliary brake 10 to the floorboard 12 of the vehicle. The extension plate 36 provides a type of cantilevering action which compliments and balances the upper portion 40 to hold the platform 20, including both the upper portion 40 and the extension plate 36 in place.

The platform 20 is configured to allow the upper portion 40 of the platform 20, to which the temporary or auxiliary brake 10 is mounted or bolted, to be tilted and placed on the inclined or sloped portion 16 of the floorboard 10. In addition, the upper portion 40 conforms to most every configuration of floorboards used in driver training vehicles and the like.

The extension plate 36 can be manipulated in the field to conform to or fit model specific vehicle floorboards 12. This allows the upper portion 40 of the platform 20 and the temporary or auxiliary brake 10 to be placed and maintained in proper position during all types of braking conditions, i.e. subtle, firm and emergency braking, initiated by the driver education instructor or the like during on-road driving lessons.

The use of the platform 20 allows the temporary or auxiliary brake 10 to be used without mounting the platform 20 or the temporary or auxiliary brake 10 to the floorboard 12 or any portion of the vehicle. This allows the platform 20 and the temporary or auxiliary brake 10 to be portable, permitting the platform 20 and the temporary or auxiliary brake 10 to be moved from vehicle to vehicle. In addition, as the platform 20 and the temporary or auxiliary brake 10 can be easily removed, servicing of the unit is facilitated.

As the use of the platform 20 and the temporary or auxiliary brake 10 does not require drilling or deformation of the vehicle, the value of the vehicle is not reduced by the use of the platform 20 and the temporary or auxiliary brake 10.

While the invention has been described with reference to a preferred embodiment, it will be understood by those skilled in the art that various changes may be made and equivalents may be substituted for elements thereof without departing from the spirit and scope of the invention as defined in the accompanying claims. In particular, it will be clear to those skilled in the art that the present invention may be embodied in other specific forms, structures, arrangements, proportions, sizes, and with other elements, materials and components, without departing from the spirit or essential characteristics thereof. One skilled in the art will appreciate that the invention may be used with many modifications of structure, arrangement, proportions, sizes, materials and components and otherwise used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

The invention claimed is:

1. A platform for use with a temporary or auxiliary brake in a vehicle, the platform comprising:
    a raised wall on which the temporary or auxiliary brake is mounted, the raised wall being spaced from a floorboard of the vehicle by sidewalls;
    stabilization flanges extending from the sidewalls;
    an extension plate extends from and is welded to a respective sidewall to provide increased stabilization of the platform and maintain the platform and the temporary or auxiliary brake in position on the floorboard of the vehicle
    wherein the positioning of the platform and the temporary or auxiliary brake in the vehicle does not require drilling or deformation of the vehicle.

2. The platform as recited in claim 1, wherein the sidewalls extend perpendicular from the raised wall.

3. The platform as recited in claim 2, wherein the stabilization flanges extend perpendicular to respective opposed sidewalls.

4. The platform as recited in claim 1, wherein the raised wall has mounting openings for receiving mounting hardware of the temporary or auxiliary brake.

5. The platform as recited in claim 1, wherein the extension plate extends from the sidewall at an angle of greater than 90 degrees and less than 180 degrees.

6. The platform as recited in claim 1, wherein the extension plate has a non-skid surface.

7. The platform as recited in claim 6, wherein the non-skid surface is a non-skid tape.

\* \* \* \* \*